United States Patent [19]

Geisler

[11] 4,333,628
[45] Jun. 8, 1982

[54] PERFORATED BOARD DISPLAY BRACKET ASSEMBLY

[75] Inventor: Robert C. Geisler, Addison, Ill.

[73] Assignee: Keystone Consolidated Industries, Inc., Peoria, Ill.

[21] Appl. No.: 167,032

[22] Filed: Jul. 9, 1980

[51] Int. Cl.$^3$ ............................................. F16M 13/00
[52] U.S. Cl. ............................... 248/551; 248/220.4; 248/221.4; 248/222.2
[58] Field of Search ................. 248/73, 220.4, 221.4, 248/222.2, 551, 221.2, 222.1

[56] References Cited

U.S. PATENT DOCUMENTS

| | | | |
|---|---|---|---|
| 1,835,042 | 12/1931 | Hammer | 248/551 X |
| 2,428,073 | 9/1947 | Handel | 248/220.4 X |
| 2,560,486 | 7/1951 | Shears | 248/73 |
| 3,211,408 | 10/1965 | Schaefer | 248/220.4 X |
| 3,424,421 | 1/1969 | Kalbow et al. | 248/220.4 X |
| 3,934,727 | 1/1976 | Brefka | 248/551 X |
| 3,978,799 | 9/1976 | Escalette | 248/220.4 X |
| 4,103,854 | 8/1978 | Pliml | 248/222.2 X |
| 4,190,221 | 2/1980 | Updike | 248/551 |

FOREIGN PATENT DOCUMENTS 1413707 11/1975 United Kingdom ............ 248/222.2

*Primary Examiner*—William H. Schultz
*Attorney, Agent, or Firm*—Allegretti, Newitt, Witcoff & McAndrews

[57] ABSTRACT

A perforated board display bracket assembly is adapted for mounting on a perforated board. The perforated board openings receive a hanger member comprised of a flexible U-shaped rod having generally parallel spaced legs connected by a crown. The legs are retained against the back side of a display panel by a locking bar which engages the legs and biases the legs toward the panel. The display panel may slide on the legs between a locked and unlocked position. When in the locked position, the hanger member is in a detent. Manual flexing of the legs releases the hanger member from the detent and permits sliding of the display panel on the hanger member for ultimate removal from the perforated board.

3 Claims, 8 Drawing Figures

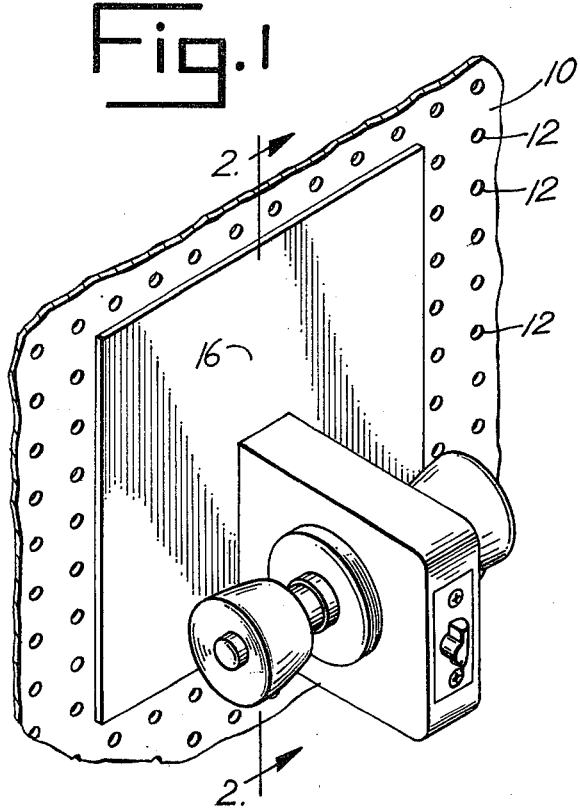
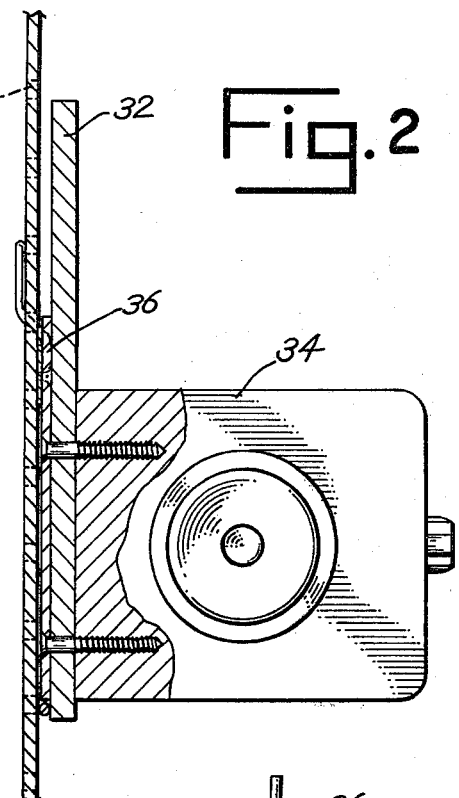
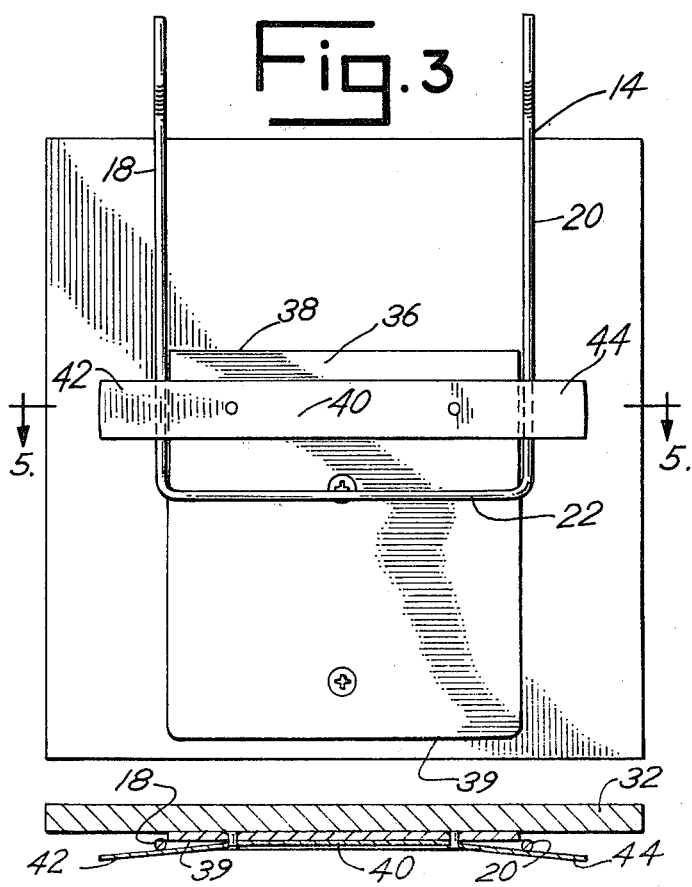
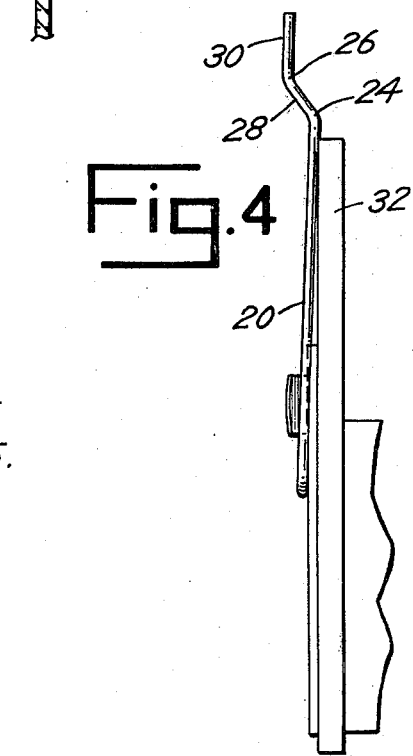

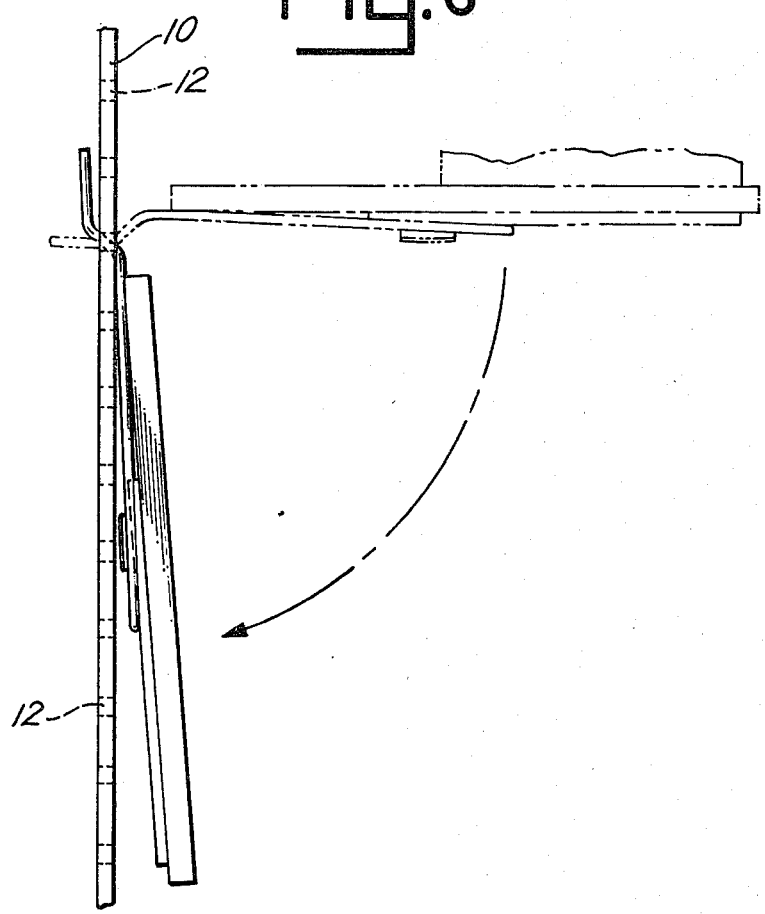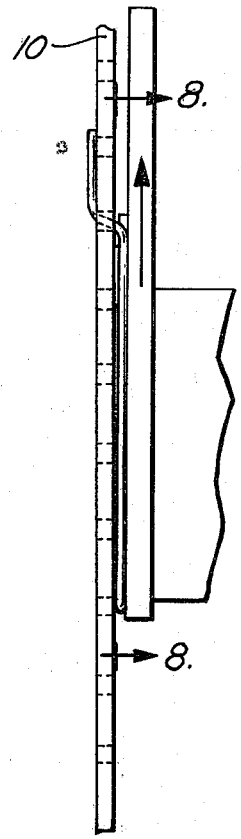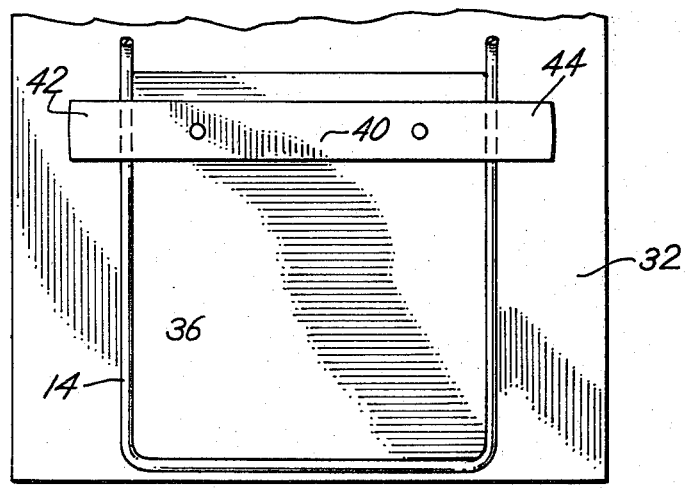

PERFORATED BOARD DISPLAY BRACKET ASSEMBLY

BACKGROUND OF THE INVENTION

In a principal aspect, the present invention relates to an improved perforated board display assembly which includes a special U-shaped hanger member cooperative with a display panel.

It is often desirable to use a perforated board for a means for displaying various items or wares particularly in a retail store. For example, tools, utensils and other items may be supported on hooks attached to a perforated board. It has been found difficult, however, to attach larger items to a perforated board such as electric tools. Often such larger items, if attached to hooks or the like, are susceptible to easy removal by shoplifters.

Consequently there has been a need for a perforated board display assembly which would permit the attachment and display of large items on a perforated board while simultaneously preventing easy removal of such items. This would provide a long lasting and secure display of desired goods or wares while simultaneously diminishing the possibility for theft of goods from a display.

These are some of the objectives and goals of the present invention.

SUMMARY OF THE INVENTION

Briefly, the present invention comprises an improved perforated board display assembly which includes a pegboard having an array of perforated board openings for receipt of a hanger member. A U-shaped hanger member cooperates with selected perforated board openings and simultaneously cooperates with a display panel which is supported by and engaged by the hanger member. The display panel includes a locking bar which engages with the opposite legs of the hanger member and permits sliding of the display panel on the hanger member to a position where the hanger member and display panel interlock. Release of the interlocking hanger member and display panel is effected by elastically bending the legs of the hanger member to release the hanger member from detent engagement with the display panel and to permit the display panel to slide from engagement with the hanger member while mounted on the perforated board.

Thus, it is an object of the invention to provide an improved perforated board display assembly.

A further object of the present invention is to provide an improved perforated board display assembly which incorporates a U-shaped hanger member cooperative with a display panel. The panel may be removed from engagement with the hanger member upon appropriate flexing of the hanger member.

Another object of the present invention is to provide a cooperative hanger member and display panel compatible with existing perforated board constructions and existing perforated board openings.

Still a further object of the present invention is to provide an improved perforated board display assembly including a display board which is substantially locked into engagement and cooperation with a perforated board.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a perspective view of the perforated board display bracket assembly of the invention;

FIG. 2 is a partial side cross sectional view of the assembly of FIG. 1 taken substantially along the line 2—2;

FIG. 3 is a rear plan view of the hanger member and display panel of the assembly of the present invention prior to attachment to the perforated board;

FIG. 4 is a side view of the structure shown in FIG. 3;

FIG. 5 is a cross sectional view of the structure shown in FIG. 3 taken substantially along the line 5—5;

FIG. 6 is a side elevation of the assembly illustrated in the manner in which the assembly is assembled;

FIG. 7 is a side elevation of the display panel hanger member and perforated board upon assembly and locking in a detent position; and FIG. 8 is a cross sectional view of the assembly taken substantially along the line 8—8 in FIG. 7.

DESCRIPTION OF THE PREFERRED EMBODIMENT

Referring to the figures, a perforated board 10 is typically fashioned from a fiberboard material, for example, the fiberboard product known by the tradename Masonite. Typically such fiberboard has a thickness of one quarter inch and includes a rectangular array of openings therethrough on one inch centers, each of the openings being approximately one quarter inch in diameter. Thus, perforated board 10 includes a plurality of openings 12.

The invention comprises the assembly of a hanger member 14 and display panel 16 cooperative with the perforated board 10. Referring first to the hanger member 14, the member 14 is a generally U-shaped flexible wire rod and includes spaced parallel legs 18 and 20 connected by a crown section 22. The legs 18, 20 and crown 22 of the hanger member 14 generally define a single plane. However, the ends of each leg 18 and 20 are formed in a double bend for cooperation with the board 10. Thus, leg 20 includes a bend 24 and a second bend 26 with a connecting run 28. A terminal section 30 lies in a plane parallel to the plane defined by the legs 18 and 20 and is spaced therefrom by approximately the thickness of perforated board 10. Each leg 18 and 20 is so constructed. In this manner the hanger member 14 and more particularly the terminal portions 30 may be inserted through spaced openings 12 as shown in the figures and then made to lie flat against the perforated board 10.

The cooperative display panel 16 includes an outside display board 32. Various products such as a door knob display 34 may be mounted on the outside of the display board 32. The display board 32 has a surface area and configuration which is substantially greater than the surface area which would be defined by the hanger member 14.

Affixed to the back side of the display board 32 is a detent panel 36 which has a configuration size and shape so that it will just fit within the circumference defined by the legs 18 and 20 and crown section 22. The detent panel 36 includes a top edge 38. Spaced slightly from the top edge 38 and parallel thereto is a thin metal retainer bar 40 with side extensions or ends 42, 44. The retainer bar 40 and panel 36 are affixed to the back side of the display board 32. The thickness of the panel 36 is approximately equal to the thickness of the hanger member 14. Thus, the hanger member 14 may be fitted in the space defined between the bar 40 and the board 32.

In operation the hanger member 14 and more particularly the legs 18 and 20 are inserted under the extensions 42 and 44 of the bar 40. Since the legs 18 and 20 are generally straight, though elastic, the hanger member 14 is forced against the surface of the board 32. The crown section 22 will ride up and over the detent panel 36. Due to the elastic forces of the legs 18 and 20, the crown section 22 will press against the panel 36. Upon subsequent sliding of the hanger member 14 with respect to the cross bar 40, the crown section 22 will fall into a detent position against the bottom edge 39 of the panel 36. The hanger member 14 then generally surrounds the panel 36 and is retained in that position by bar 40.

Thus, as shown in FIGS. 7 and 8, the display board 32 will be retained in position on perforated board 10. To remove the display board 32 from the perforated board 10, the crown section 22 is elevated or moved away from the display board 32 detent position so that it will ride up and over the panel 36. Simultaneously the display board 32 and attached bar 40 are moved in a downward direction so that the generally horizontal crown section 22 will ride up on the panel 36 as shown in FIGS. 3, 4 and 5. In this manner the display board 32 may be sufficiently moved so that the hanger member 14 may be rotated and removed from perforated board 10 as shown in FIG. 6. Reversing the sequence of operation will re-assemble the display board 32 on the perforated board 10.

With the structure of the present invention it is possible to retain a display panel or board in a fixed position on a perforated board particularly in a retail display. It is very difficult to remove the display board unless knowledge of the exact assembly and detent mechanism is known. Even then some time and dexterity will be required to remove the display board 32. For this reason the improvement of the present invention provides an important manner for mounting and displaying various goods or wares and improves the security associated with such a display.

Thus, while there has been set forth a preferred embodiment of the invention, it is to be understood that the invention is to be limited only by the following claims and their equivalents.

What is claimed is:

1. An improved perforated board display assembly comprising, in combination:
   a perforated board having an array of perforated board openings for receipt of a hanger member;
   a hanger member comprised of a flexible U-shaped rod having generally parallel, spaced legs connected by a crown section, the legs each terminating in a double bend which projects through the perforated board openings to define parallel runs on each side of the perforated board, said legs having extended elastic runs connected to the crown section; and
   a display board comprising a planar detent panel conforming in general to the shape and size between the legs and crown section, a second display panel extending over the planar detent panel and facing one side of the planar detent panel and hanger member, and a cross bar member affixed on the opposite side of the planar detent panel and projecting over a portion of the extended elastic runs of the legs whereby the display board is positioned and retained on the hanger member which, in turn, is engaged with the perforated board, said display board being removed by elastically deflecting the legs of the hanger member to permit slidable removal of the display board planar detent panel from engagement with the hanger member.

2. The improved assembly of claim 1 wherein the crown section is arranged in a horizontal orientation and vertically below the ends of the legs.

3. The improved assembly of claim 1 wherein the second display panel extends and covers the entire hanger member.

* * * * *